(12) United States Patent
Stough

(10) Patent No.: US 6,226,957 B1
(45) Date of Patent: May 8, 2001

(54) DRYWALL JOINT SYSTEM

(75) Inventor: Ronald A. Stough, Madison, WI (US)

(73) Assignee: E-Z Taping System, Inc., Green Bay, WI (US)

( * ) Notice: Subject to any disclaimer, the term of this patent is extended or adjusted under 35 U.S.C. 154(b) by 0 days.

(21) Appl. No.: 09/286,387

(22) Filed: Apr. 5, 1999

Related U.S. Application Data

(63) Continuation-in-part of application No. 08/915,385, filed on Aug. 20, 1997, now Pat. No. 5,891,282, which is a continuation-in-part of application No. 08/677,382, filed on Jul. 5, 1996, now Pat. No. 5,711,124, which is a continuation-in-part of application No. 08/513,386, filed on Aug. 10, 1995, now Pat. No. 5,687,523, which is a continuation-in-part of application No. 08/297,320, filed on Aug. 26, 1994, now Pat. No. 5,486,394.

(51) Int. Cl.$^7$ .................. E04B 2/00; E04B 9/00
(52) U.S. Cl. ............... 52/745.2; 52/417; 52/460; 52/745.21; 52/745.05; 156/71
(58) Field of Search .............. 52/417, 420, 460, 52/741.4, 745.05, 745.09, 745.19, 745.2, 745.21, 746.1; 156/71

(56) References Cited

U.S. PATENT DOCUMENTS

| | | |
|---|---|---|
| 1,357,350 | 11/1920 | Schumacher . |
| 2,318,053 | 5/1943 | Brusse . |
| 2,463,244 | 3/1949 | Carter . |
| 2,502,499 | 4/1950 | Ames . |
| 3,109,207 | 11/1963 | Cooper . |
| 3,575,771 | 4/1971 | Padgett . |
| 3,788,941 | 1/1974 | Kupits . |
| 4,042,739 | 8/1977 | Emal et al. . |
| 4,263,677 | 4/1981 | Menser . |
| 4,313,991 | 2/1982 | Lamb . |
| 4,331,727 | 5/1982 | Maas . |
| 4,398,985 | 8/1983 | Eagon . |
| 4,399,170 * | 8/1983 | Janssen ..................... 156/71 X |
| 4,421,808 | 12/1983 | Winkowski . |
| 4,707,202 | 11/1987 | Sweeny . |
| 4,750,968 | 6/1988 | Sweeny . |
| 4,792,473 | 12/1988 | Vitale . |
| 4,835,925 | 6/1989 | Hoffmann, Sr. . |
| 4,863,774 | 9/1989 | Tucker . |
| 4,977,718 | 12/1990 | Hoffman, Sr. . |
| 5,037,686 | 8/1991 | Conboy . |
| 5,242,725 | 9/1993 | Weissmann et al. . |
| 5,246,775 | 9/1993 | Loscuito . |
| 5,486,394 | 1/1996 | Stough . |
| 5,687,523 | 11/1997 | Stough . |
| 5,711,124 | 1/1998 | Stough et al. . |
| 5,814,184 * | 9/1998 | Denkins ..................... 156/577 |
| 5,891,282 | 4/1999 | Stough et al. . |

FOREIGN PATENT DOCUMENTS 2305919    11/1976   (FR) .

* cited by examiner

Primary Examiner—Laura A. Callo
(74) Attorney, Agent, or Firm—Lathrop & Clark LLP

(57) ABSTRACT

A joint is formed between adjacent sheets of wall board, particularly in the fabrication of ceiling assemblies in manufactured housing, by applying a pressure-sensitive imperforate paper tape, burnishing it, wetting it, and then applying flexible joint compound over the tape. The flexible joint compound rapidly forms a skin which will receive paint, texture coating, or other finish prior to the complete curing of the flexible joint compound. The retained flexibility of the flexible joint compound, which lasts for at least twenty-four hours, permits the joint to be tolerant of displacement, such as the racking and twisting imposed on a ceiling assembly in transportation.

7 Claims, 2 Drawing Sheets

DRYWALL JOINT SYSTEM

CROSS REFERENCES TO RELATED APPLICATIONS

This application is a continuation-in-part of application Ser. No. 08/915,385, filed Aug. 20, 1997, which will issue on Apr. 6, 1999, as U.S. Pat. No. 5,891,282, which is a continuation-in-part of application Ser. No. 08/677,382, filed Jul. 5, 1996, now U.S. Pat. No. 5,711,124, which is a continuation-in-part of application Ser. No. 08/513,386, filed Aug. 10, 1995, now U.S. Pat. No. 5,687,523, which is a continuation-in-part of application Ser. No. 08/297,320, filed Aug. 26, 1994, now U.S. Pat. No. 5,486,394, the disclosures of all of said listed applications being hereby incorporated by reference herein.

STATEMENT AS TO RIGHTS TO INVENTIONS MADE UNDER FEDERALLY SPONSORED RESEARCH AND DEVELOPMENT

BACKGROUND OF THE INVENTION

The present invention relates to methods for bridging the joint between wall board panels in general, and to methods for bridging the joint in structures subject to later flexing or distortion in particular.

In modern commercial and residential construction interior wall surfaces are typically formed from flat modular units affixed to wood or metal studs. These units, know as sheet rock, gypsum board, plasterboard or generically herein as wall board, come in standard dimensions which are abutted to form a continuous surface. In order to present a surface which is unmarked by visible seams, it is necessary to position bridging tape which overlaps the joint and which supports a coating of a wet plaster-like compound known as mud. The mud is applied to obscure any variations in the wall profile, and to form the wall surface into an uninterrupted expanse.

Conventional drywall tape is typically a simple perforated kraft paper strip which is adhered to the drywall surfaces by a coating of mud. Because the mud must be applied as the tape is positioned, operators must take care not to discharge the mud onto non-work surfaces. In addition, once the drywall tape has been applied an installer must wait as much as a day for the mud to dry before a final surface coat of mud can be applied.

In the manufactured housing industry, however, houses of modular dimensions are assembled on an assembly-line as part of an ongoing process. Whereas in conventional site built housing, the structure of the house, including all framing and truss work, is completed before drywall is attached, in manufactured housing subassemblies comprised of roof trusses and drywall forming a ceiling are prepared and transported into place on the structure's walls. This displacement and transportation of a drywall ceiling assembly after it has been taped and mudded subjects the drywall joints to racking and twisting which may immediately cause cracking at the joints, or may induce cracks to appear at a later time. Cracked ceilings are unacceptable to the purchaser of a new manufactured home and impose significant costs on the manufacturer for on-site visits to manually repair the cracks.

Gypsum-based mud dries to a brittle substance. Although this dried mud is readily sanded or painted, it is also susceptible to cracking when subjected to racking and twisting. Flexible joint compounds are known which rapidly form a skin which can be painted, while the interior of the applied flexible joint compound remains soft and un-cured. However, the portions which dry are extremely hard and are not readily sanded. Conventional self-adhesive drywall tapes such as mesh tape, and the tape disclosed in U.S. Pat. No. 5,246,775 to Loscuito, have a multitude of screen openings or perforations which, when penetrated by the flexible joint compound act to extrude a multitude of tiny protrusions which significantly compromise the smooth surface of the ceiling.

What is needed is a method for bridging the seams between adjacent ceiling or wall boards and a manner which permits immediate painting and finishing yet which is tolerant of subsequent displacement.

SUMMARY OF THE INVENTION

The joint between two adjacent wall boards, particularly those mounted horizontally to define a ceiling, is bridged by a strip of unperforated pressure-sensitive adhesive-backed paper tape, and is then coated with a flexible joint compound. The flexible joint compound rapidly develops an outer skin which may be painted, yet retains an uncured resilient interior, which is tolerant of racking and twisting when the wall boards are displaced. For best results, the applied and burnished tape is wetted with a soaked sponge prior to application of the flexible joint compound.

It is an object of the present invention to provide a method for forming a seam between wall boards which is tolerant of racking and twisting of the wall boards and resistant to cracking.

It is another object of the present invention to provide a method for taping seams between wall board panels which yields consistent non-protruding seams.

It is also an object of the present invention to provide a method for taping seams between wall board panels on ceilings in manufactured housing.

It is an additional object of the present invention to provide a ceiling truss and wall board assembly which is tolerant of twisting and racking in a finished condition.

Further objects, features and advantages of the invention will be apparent from the following detailed description when taken in conjunction with the accompanying drawings.

DESCRIPTION OF THE PREFERRED EMBODIMENT

Figure 1:
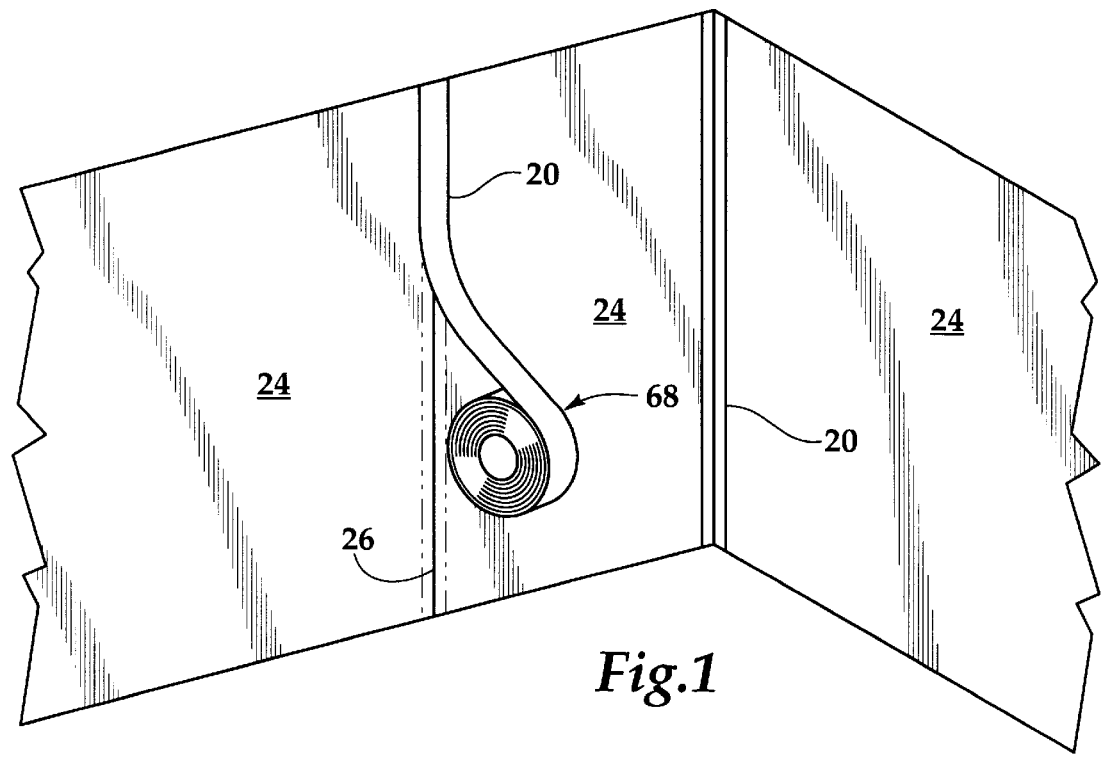
FIG. 1 is a pictorial view representing a pressure-sensitive tape being applied to a seam between adjacent sheets of drywall material in the process of this invention.
Figure 2:
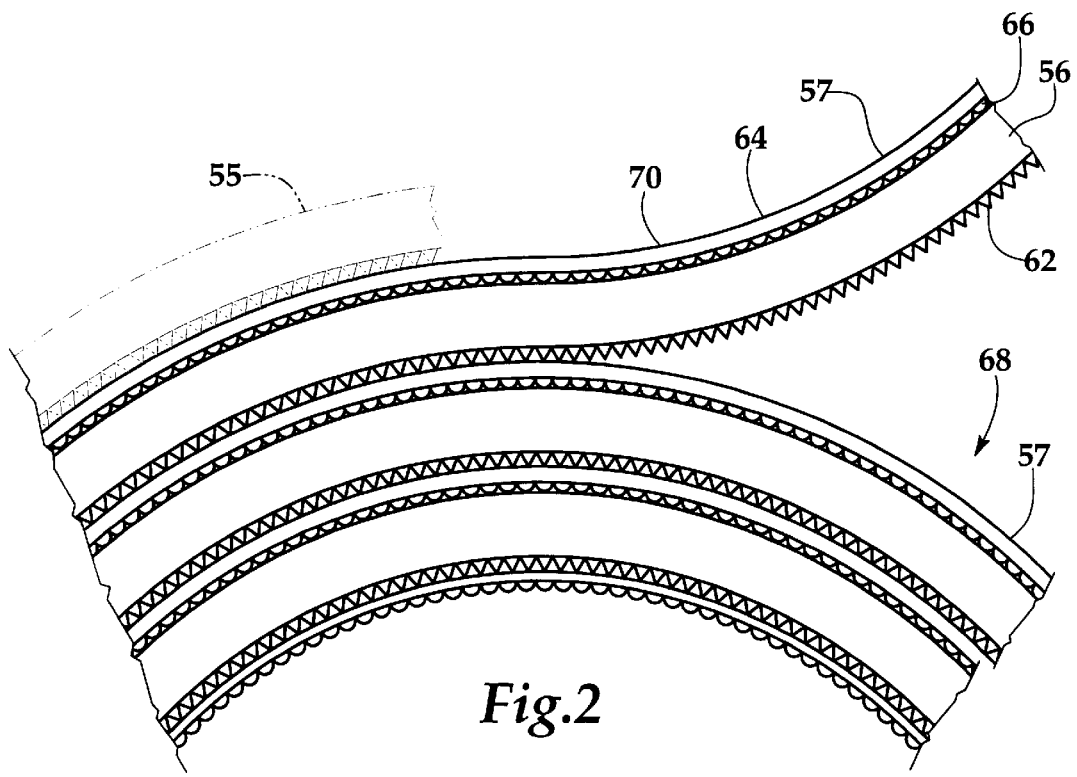
FIG. 2 is a schematic view of a pressure-sensitive tape wound into a roll, with a portion of the paper base layer unwound from the roll.
Figure 3:
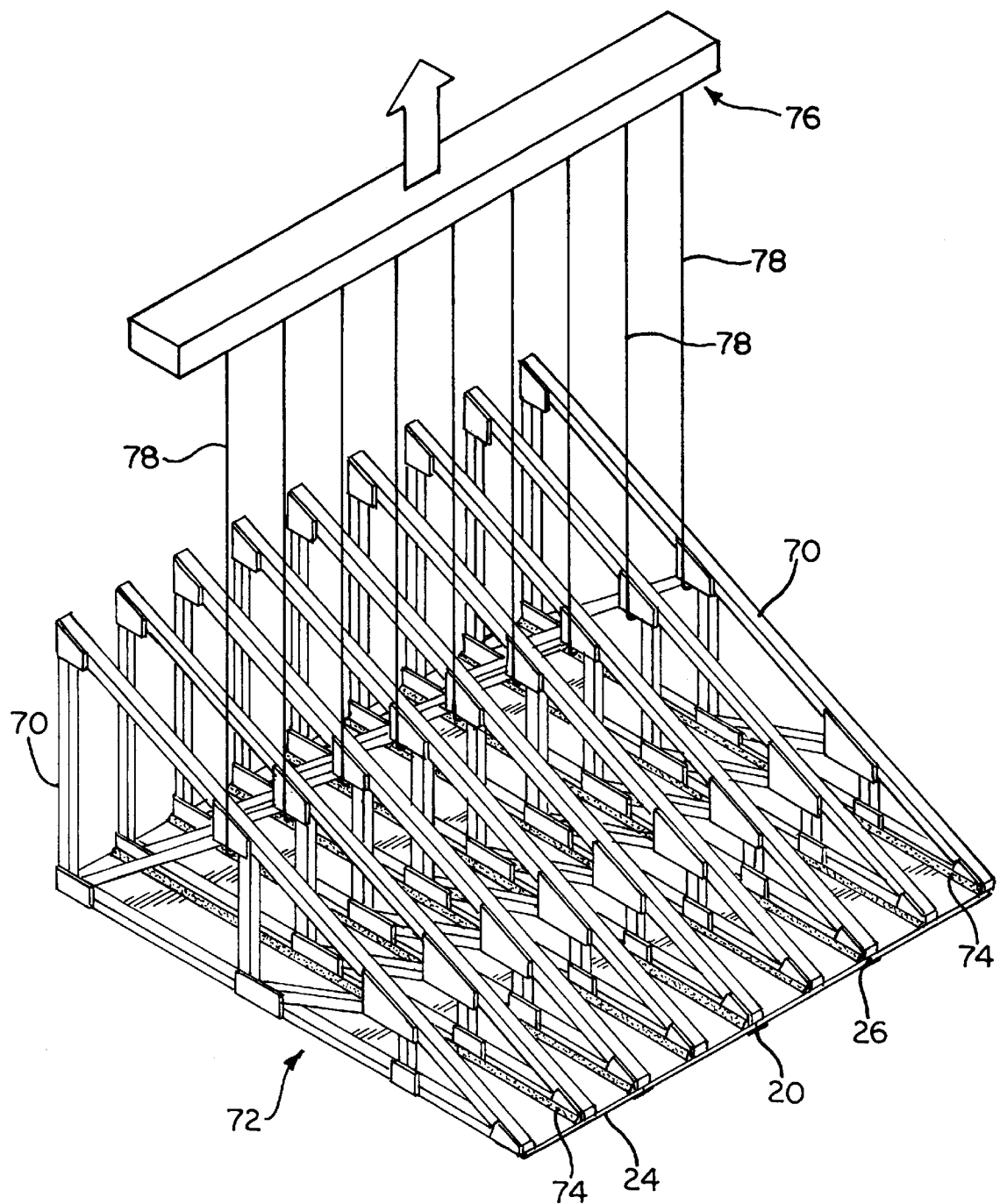
FIG. 3 is an isometric view of a ceiling assembly employing the drywall joint system of this invention.

Referring more particularly to FIGS. 1–3, wherein like numbers refer to similar parts, conventional wall board panels 24, as shown in FIG. 1, are affixed to the studs in an interior building construction. To facilitate manipulation and transportation of the wall board panels, they are typically manufactured in sizes which are less than the surface area of the entire wall. When two panels 24 are abutted against one another a joint 26 is formed. This joint 26 presents a surface level variation or crack which must be covered or bridged prior to the application of paint or other wall covering or finish to present a smooth, uninterrupted wall surface.

As shown in FIG. 3, wall board panels 24 are also used in the fabrication of manufactured housing. Manufactured housing units are created in an assembly-line type process in which the panels 24 are connected to roof trusses 70 to form a ceiling assembly 72 which is then brought together with assembled building walls. The ceiling assembly 72 is constructed by laying out wall board panels 24 which are up to 16 feet long and four feet wide on a work surface. The panels 24 are positioned adjacent one another with the side which will define the finished surface facing downwardly. A series of roof trusses 70 is then positioned to overlie the adjacent wall board panels 24. A roof truss 70 overlies each joint between two adjacent panels 24. Typically, additional roof trusses 70 will be spaced on two foot centers across the ceiling assembly 72. The roof trusses 70 are connected to the panels 24 by strips of adhesive foam 74, eliminating the need for mechanical fasteners. With the roof trusses 70 connected to the panels 24 and to one another, a lifting beam 76 is positioned overhead of the ceiling assembly 72. An array of cables 78 extends downwardly from the lifting beam 76, with each cable hooked to an underlying roof truss 70. The lifting beam 76 is then elevated to position the underside of the wall board panels 24 at a convenient height for taping, mudding, and painting of the ceiling.

The pressure sensitive tape 20 is then dispensed from a roll 68 to cover each joint 26. An example of a pressure-sensitive adhesive backed paper tape is the tape manufactured by E-Z Taping System, Inc., of Green Bay, Wis., and disclosed in U.S. Pat. No. 5,711,124, the disclosure of which is incorporated by reference herein. However, the conventional drywall finishing tape adapted for use with gypsum mud is punctured by an array of perforations. For use with flexible joint compound, the tape 20 of this invention is formed entirely without perforations. The imperforate tape 20 may be supplied in rolls 68 of a tape assembly which includes the tape 20 itself together with a transfer liner 57. The tape assembly has an untreated paper outer surface 55. The tape 20 has a paper base layer 56, shown in FIG. 2, which may be identical to the conventional paper used in non-adhesive drywall tape such as is available from International Paper Company of New York. This paper base layer 56 may be an 85 lb. basis weight paper having an outer surface 55 which is untreated and absorptive and hence receptive to the mud coating which will be applied over the tape. The paper may have either a sanded or unsanded finish.

The inner surface of the base layer is coated with a layer of high tack adhesive 62, for example an aqueous acrylic adhesive such as 15–20 pounds per 3000 square feet Green Bay Packaging #540 adhesive, available from Green Bay Packaging, of Green Bay, Wis. For improved adhesion and reduced migration of the adhesive into the base layer, a clay coating may be applied to the base layer 56 prior to application of the high-tack adhesive. Because the absorptive untreated surface 55 of the base layer would adhere in a somewhat permanent fashion to the high-tack adhesive layer 62 of an overlying length of tape 20 if placed in direct engagement, a means for keeping the two surfaces separate is provided. The transfer liner 57 is a lighter weight paper, for example a 20–60 pound layflat liner, which is provided on one face with a release surface 64 which may be formed by an application of silicone. The release surface will engage with the high-tack adhesive of the base layer 56, but is easily releasable from the high-tack adhesive, requiring a peel strength of, for example, 10–15 grams per inch. The other face of the transfer liner 57 is coated with a low tack removable adhesive layer 66. The removable adhesive is similar to the type employed with removable sticky note pads. An exemplary adhesive is Morstik® 240 adhesive, available from Morton International, Inc., of Chicago, Ill. Another suitable adhesive is AROSET® APS-1250 water-based pressure sensitive adhesive, available from Ashland Chemical Co. Division of Ashland Inc., of Columbus, Ohio. Other removable adhesives may also be used. The low-tack adhesive is such that when adhered to the outer surface 55 of the base layer 56 and removed, the receptivity of the base layer 56 to mud or plaster will not be substantially impaired. The removable adhesive layer is designed to adhere to the outer surface of the paper base layer when the tape assembly is wound into a roll 68.

The tape 20 and transfer liner are dispensed from the roll 68 directly onto the joint 26 to be taped. Various roll tape dispensers may be employed. The applied tape assembly may consist of a length of tape 20 attached to the wall and a transfer liner 57 connected by the removable adhesive layer to the outer surface 55 of the tape. Alternatively, the transfer liner may be removed as the tape is applied to the joint. In any event, the transfer liner is removed to expose the outer surface 55 of the paper layer. Generally, the tape is dispensed from the roll with relatively light pressure to the joint. Once applied and in place on the joint, pressure is applied by running a drywall knife, burnishing implement, or other stiff object along the tape to press the tape down onto the wall board panels. Because the removable adhesive leaves little residue on the outer surface 55 of the paper base layer 56, the receptability of the paper to mud is substantially unimpaired. A drywall knife with a split blade may also be used to burnish the tape.

The applied tape 20 is preferably wetted by soaking a sponge in water, either hot or cold, until the sponge is heavily filled with water. The sponge serves as a water carrier for transporting water from a bucket or other reservoir to the surface 55 of the tape 20. Pressure is applied to the soaked sponge as it is moved along the burnished tape 20. The joint is wiped down with the wet sponge, to wet the paper surface 55 of the tape. The sponge is preferably very wet, not simply moist or damp, and in like measure, the paper tape is more than just dampened but is preferably soaked.

Next flexible joint compound is applied to the wetted paper surface. The flexible joint compound may be applied to the wetted paper tape while it is still damp, or the mud may be applied to the wetted paper tape after it has dried. Once applied, the flexible joint compound rapidly begins to cure, resulting in an outer layer or skin of flexible joint compound which is receptive to painting. Thus in a short period of time the taped and coated joints may be finished, such as by an application of paint, texture, or other finishing material. However, a beneficial attribute of the flexible joint compound is that, although the outer skin hardens, the unexposed portions of the flexible joint compound remain resilient for an extended period of time, at least 24 hours. Therefore, once the ceiling assembly 72 has been completed and painted, it may be raised up on the lifting beam 76 with a significant tolerance within the flexible joint compound to the inevitable racking and twisting of the joints 26. The ceiling assembly 72 is elevated on the lifting beam 76 and is transported to the awaiting building structure walls where it is connected in place.

Flexible joint compound has been known to the art for some time. However, when used with perforated tapes, such as mesh tape, an unacceptable phenomenon was displayed. When perforated tape is coated with flexible joint compound, the compound penetrates the perforations into the joint. On flexing of the joint, such as by lifting the ceiling assembly, a fraction of the joint compound can be squeezed or extruded downwardly through the perforations. Flexible joint compound, when cured, is extremely hard and is hence difficult to sand down or smooth over. These extruded points or protrusions disrupted the smooth surface desired for a ceiling, making the use of flexible joint compound undesirable.

An example of a flexible joint compound for use in the method of this invention, is the material sold under the name Seam Flex, by Proko Industries, 501 South Foote Street, Cambridge City, Ind., www.proko.com/proko.htm. Distributors carrying this flexible joint compound are Kevco and Shelter Components. Flexible joint compound is a material which exhibits the property of being applicable over paper tape in a thin layer, and which rapidly forms an outer layer or skin which is receptive to finishing, while an interior layer remains flexible for an extended period of time, exceeding 24 hours.

It should be noted that although ceiling wall board assemblies have been illustrated, vertically extending wall board assemblies may also be formed as described above.

It is understood that the invention is not limited to the particular construction and arrangement of parts herein illustrated and described, but embraces such modified forms thereof as come within the scope of the following claims.

I claim:

1. A method for forming a transportable ceiling assembly for installation in a manufactured housing unit, comprising the steps of:

positioning two wall board panels adjacent one another to define a joint between the adjacent panels;

applying pressure-sensitive self-adhesive unperforated tape to bridge the joint between two adjacent wall board panels, the unperforated tape having a surface which faces outwardly;

applying a flexible joint compound over the outwardly facing tape surface; and applying a finish over the applied flexible joint compound after it has formed a skin which will receive said finish, but before the flexible joint compound has completely hardened.

2. The method of claim 1 wherein the step of applying flexible joint compound to the tape is preceded by a step of bringing a water-soaked carrier into contact with the tape, to thereby wet the tape outwardly facing surface prior to the application of the joint compound.

3. A method for bridging a joint between two adjacent wall board panels to form an assembly which is tolerant of displacement after formation to thereby resist cracking at the joint, the method comprising the steps of:

applying a strip of pressure-sensitive adhesive backed paper tape over a joint between two adjacent wall board panels such that a paper surface faces outwardly, wherein the applied tape is substantially without perforations;

applying pressure to the applied strip of paper tape to secure it to the adjacent wall board panels;

applying a flexible joint compound over the applied strip of paper tape and allowing a skin to form on the applied joint compound; and applying a finish to the skin of the flexible joint compound prior to the complete hardening of the flexible joint compound, such that the applied flexible joint compound retains some flexibility after the application of the finish.

4. The method of claim 3 wherein the step of applying flexible joint compound to the tape is preceded by a step of bringing a water-soaked carrier into contact with the tape, to thereby wet the tape outwardly facing surface prior to the application of the joint compound.

5. The method of claim 4 wherein the step of coating the wetted paper surface with flexible joint compound is performed immediately after the step of pressing the soaked carrier against the applied tape, to thereby apply flexible joint compound to a wet paper surface.

6. The method of claim 4 wherein the step of coating the wetted paper surface with flexible joint compound is performed after the wetted paper has dried.

7. A method for forming a transportable wall board assembly for installation in a manufactured housing unit, comprising the steps of:

positioning two wall board panels adjacent one another to define a joint between the adjacent panels;

applying pressure-sensitive self-adhesive unperforated tape to bridge the joint between two adjacent wall board panels, the unperforated tape having a surface which faces outwardly;

applying a flexible joint compound over the outwardly facing tape surface; and applying a finish over the applied flexible joint compound after it has formed a skin which will receive said finish, but before the flexible joint compound has completely hardened;

moving the wall board assembly from the location at which it was formed while the flexible joint compound is still tolerant of displacement.

* * * * *